United States Patent
Fornage

(10) Patent No.: US 7,916,505 B2
(45) Date of Patent: Mar. 29, 2011

(54) METHOD AND APPARATUS FOR A LEAKAGE ENERGY RECOVERY CIRCUIT

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 223 days.

(21) Appl. No.: 12/380,860

(22) Filed: Mar. 4, 2009

(65) Prior Publication Data
US 2009/0225574 A1  Sep. 10, 2009

Related U.S. Application Data

(60) Provisional application No. 61/068,296, filed on Mar. 6, 2008.

(51) Int. Cl.
*H02M 3/335* (2006.01)
(52) U.S. Cl. .................. 363/21.01; 363/56.01; 363/131
(58) Field of Classification Search .............. 363/20, 363/21.01, 39, 40, 55, 56.01, 123, 131
See application file for complete search history.

(56) References Cited

U.S. PATENT DOCUMENTS

| | | |
|---|---|---|
| 4,392,087 A | 7/1983 | Zansky |
| 5,570,278 A | 10/1996 | Cross |
| 5,600,545 A | 2/1997 | Simpkins |
| 5,694,302 A | 12/1997 | Faulk |
| 5,796,595 A | 8/1998 | Cross |
| 5,818,268 A | 10/1998 | Kim et al. |
| 5,986,905 A * | 11/1999 | Cheng ......................... 363/56.11 |
| 6,005,782 A | 12/1999 | Jain et al. |
| 6,069,803 A | 5/2000 | Cross |
| 6,473,318 B1 * | 10/2002 | Qian et al. ................. 363/21.16 |
| 6,487,094 B1 * | 11/2002 | Weng et al. ................ 363/21.12 |
| 6,980,018 B2 | 12/2005 | Ngo et al. |
| 6,995,986 B2 * | 2/2006 | Balakrishnan et al. ......... 363/16 |
| 7,027,312 B2 * | 4/2006 | Park ................................. 363/18 |
| 7,149,097 B1 * | 12/2006 | Shteynberg et al. ............. 363/16 |
| 7,180,759 B2 | 2/2007 | Liptak et al. |
| 2005/0146310 A1 * | 7/2005 | Orr ................................ 323/222 |
| 2007/0035970 A1 * | 2/2007 | Park ................................ 363/18 |
| 2009/0257254 A1 * | 10/2009 | Leu ................................ 363/40 |

FOREIGN PATENT DOCUMENTS

| | | |
|---|---|---|
| JP | 1107621 A | 4/1989 |
| JP | 2002027764 A | 1/2002 |

OTHER PUBLICATIONS

International Search Report and Written Opinion mailed Oct. 20, 2009 for PCT Application No. PCT/US2009/036101.
Mekhilef, Saad et al., "A New Solar Energy Conversion Scheme Implemented Using Grid-Tied Single Phase Inverter," 2000 IEEE Proceeding of the TENCON 2000, vol. 3, pp. 524-527, Sep. 2000.
Achille, Emmanuel et al., "Optimized DC-AC Boost Converters for Modular Photovoltaic Grid-Connected Generators," 2004 IEEE International Symposium on Industrial Electronics, vol. 2, pp. 1005-1010, May 2004.

(Continued)

*Primary Examiner* — Adolf Berhane
(74) *Attorney, Agent, or Firm* — Moser IP Law Group

(57) ABSTRACT

A method and apparatus for recovering leakage energy during DC power to AC power conversion. The apparatus comprises a leakage energy recovery circuit for storing leakage energy from a transformer and selectively coupling stored leakage energy to an input of the transformer.

18 Claims, 4 Drawing Sheets

OTHER PUBLICATIONS

Martins, Denizar Cruz et al., "Grid Connected PV System Using Two Energy Processing Stages," 2002 IEEE Photovoltaic Specialists Conference, pp. 1649-1652, May 2002.

Kjaer, Soeren Baekhoej et al., "A Review of Single-Phase Grid-Connected Inverters for Photovoltaic Modules," 2005 IEEE Transactions on Industry Application, vol. 41, No. 5, pp. 1292-1306, Sep.-Oct. 2005.

* cited by examiner

METHOD AND APPARATUS FOR A LEAKAGE ENERGY RECOVERY CIRCUIT

CROSS-REFERENCE TO RELATED APPLICATIONS

This application claims benefit of U.S. provisional patent application Ser. No. 61/068,296, filed Mar. 6, 2008, which is herein incorporated in its entirety by reference.

BACKGROUND OF THE INVENTION

1. Field of the Invention

Embodiments of the present invention generally relate to a power inverter and, more particularly, to utilizing a leakage energy recovery circuit to enhance the efficiency of a power inverter.

2. Description of the Related Art

Inverters denote a class of power conversion circuits used to produce AC power from DC power. Such inverters find widespread use in alternative energy systems where solar panels, wind turbines, hydroelectric generators, and the like produce DC power that requires conversion to AC power to facilitate coupling the generated power to the AC commercial power grid. In such systems, the power conversion process must be performed in an efficient manner.

Conventionally, inverter circuits utilize a transformer to "step up" the voltage produced by the source. During operation of the transformer, current flowing in a primary winding produces a magnetic flux that is coupled to a secondary winding. The magnetic flux also traverses paths outside the windings, resulting in leakage inductance in the transformer. The leakage inductance is a property of the transformer in which the windings of the transformer appear to have some self inductance in series with each winding. The energy stored in the leakage inductance cannot be transferred to the secondary winding, and a quick change in the primary current, such as when the control switch turns off, will induce a voltage surge which could damage the switch.

To control the level of voltage surge, existing technologies utilize resistor-capacitor (RC) circuits coupled across the primary winding of the transformer to drain such leakage energy. In these circuits, the leakage energy is applied to a capacitor and then dissipated through a resistor. Such designs waste the energy of the leakage energy, which decreases the overall efficiency of the inverter.

Accordingly, there exists a need for an inverter having a leakage energy recovery circuit.

SUMMARY OF THE INVENTION

Embodiments of the present invention generally relate to a method and apparatus for recovering leakage energy during DC power to AC power conversion. The apparatus comprises a leakage energy recovery circuit for storing leakage energy from a transformer and selectively coupling stored leakage energy to an input of the transformer.

BRIEF DESCRIPTION OF THE DRAWING

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
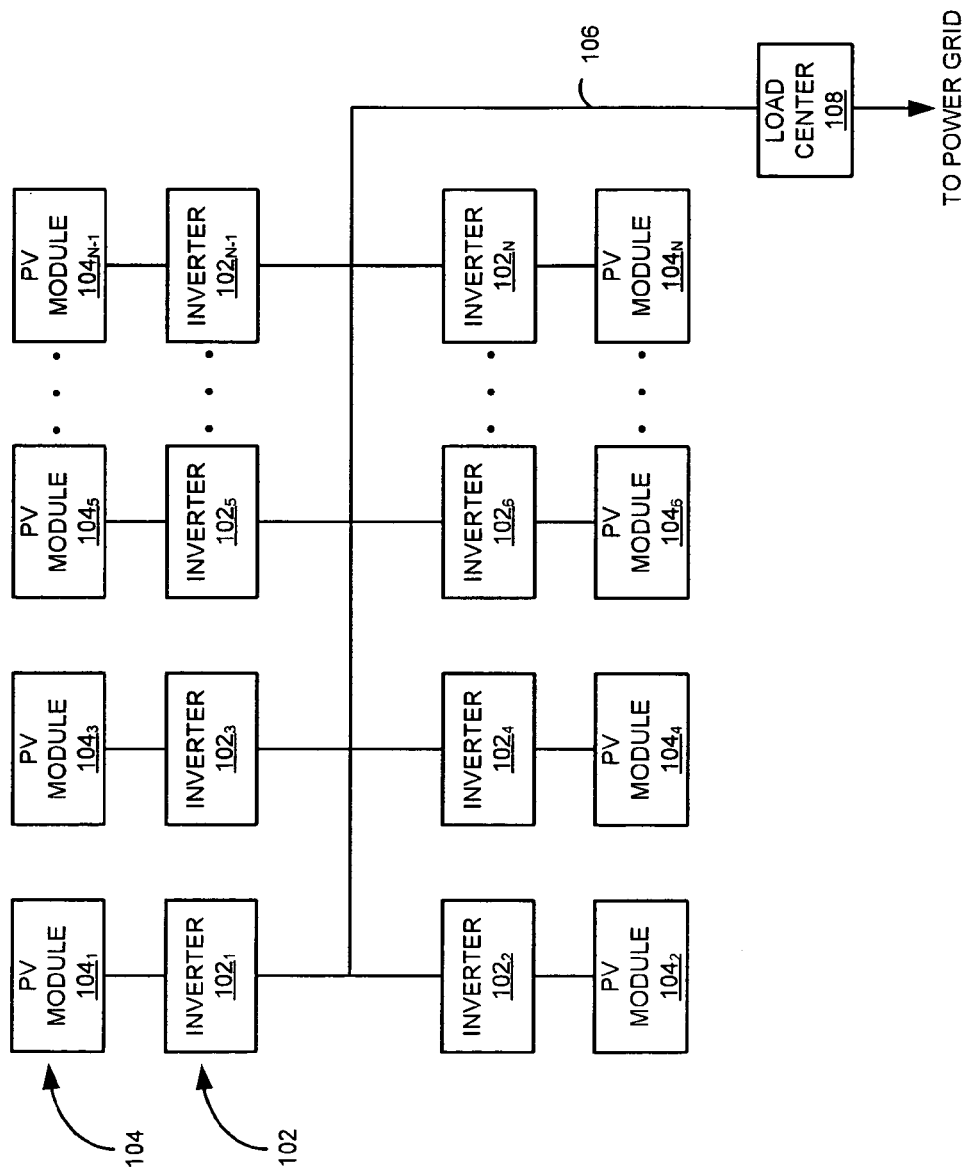
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ ... $102_n$, collectively referred to as inverters 102, a plurality of PV modules $104_1$, $104_2$ ... $104_n$, collectively referred to as PV modules 104, an AC bus 106, and a load center 108. Each inverter $102_1$, $102_2$ ... $102_n$ is coupled to a PV module $104_1$, $104_2$ ... $104_n$, respectively. Alternatively, multiple PV modules 104 may be coupled to a single inverter 102 (i.e., a centralized inverter). In other embodiments, the inverters 102 may receive input from DC sources other than PV modules.

The inverters 102 are coupled to the AC bus 106, which in turn is coupled to the load center 108. The load center 108 houses connections between incoming power lines from a commercial power grid distribution system and the AC bus 106. The inverters 102 convert DC power generated by the PV modules 104 into AC power, and meter out AC current that is in-phase with the AC commercial power grid voltage. The system 100 couples the generated AC power to the commercial power grid via the load center 108.

In accordance with one or more embodiments of the present invention, the inverters 102 comprise a leakage energy recovery circuit, described in detail below. The leakage energy recovery circuit recovers energy from a leakage inductance ("leakage energy") within the inverter 102 and feeds such recovered energy back to the input of the inverter 102 for use during the power conversion process, thereby improving the efficiency of the inverter 102.

Figure 2:
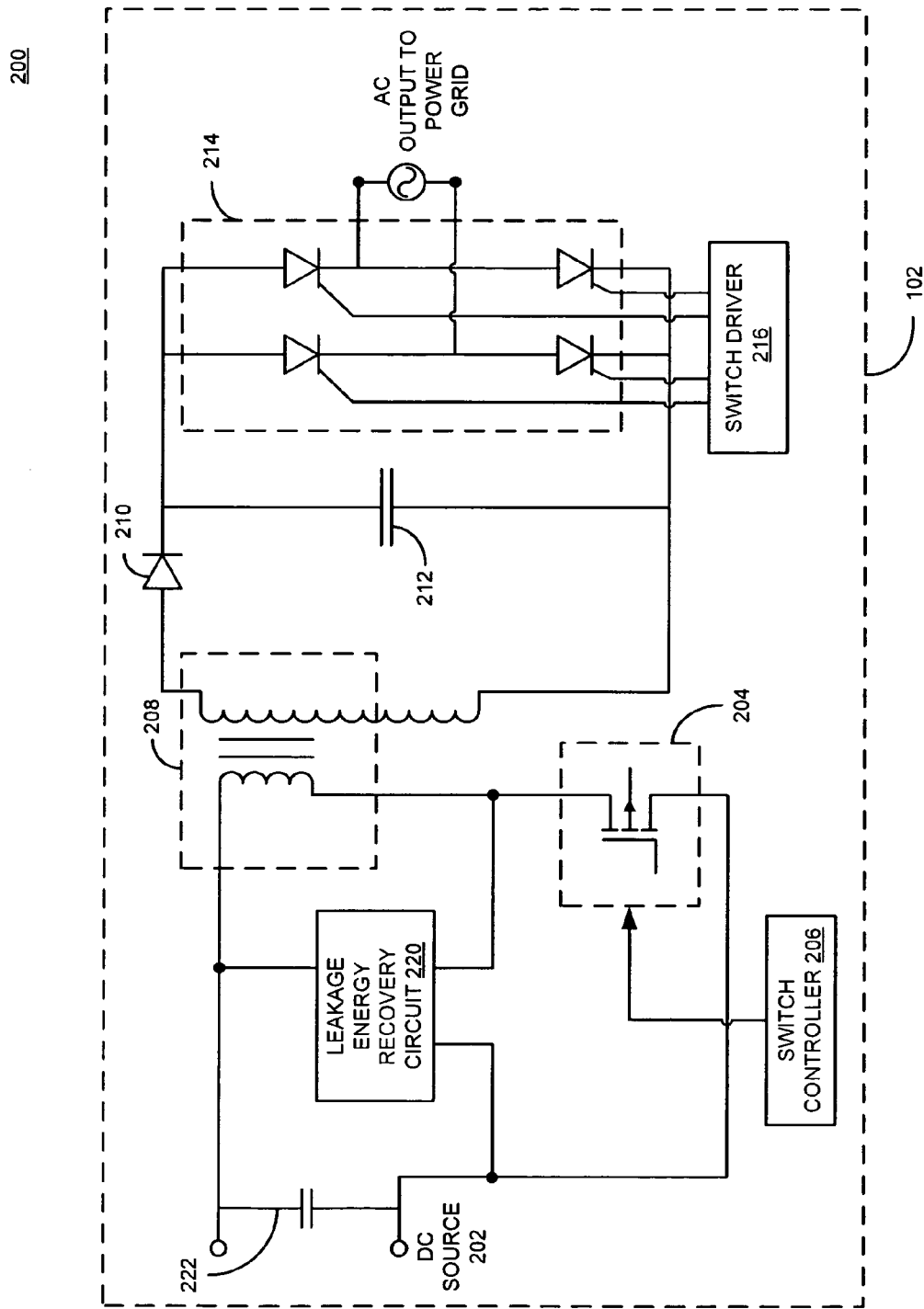
FIG. 2 is a schematic representation of an inverter comprising a leakage energy recovery circuit in accordance with one or more embodiments of the present invention.

FIG. 2 is a schematic representation of an inverter 102 comprising a leakage energy recovery circuit 220 in accordance with one or more embodiments of the present invention. The inverter 102 is coupled to a DC power source 202, such as the PV module 104, for providing DC voltage to the inverter 102. In addition to the leakage energy recovery circuit 220, the inverter 102 comprises a bypass capacitor 222, a switch 204, a switch controller 206, a transformer 208, a diode 210, a capacitor 212, a switch matrix 214, and a switch driver 216.

A primary winding of the transformer 208 and the switch 204 are coupled in series across the DC power source 202. A first and a second terminal of the leakage energy recovery circuit 220 are coupled to a first and a second terminal of the primary winding, respectively, to recover the leakage energy induced in the transformer 208 in a manner that is described with respect to FIG. 3 below. The bypass capacitor 222 is coupled in parallel to the DC power source 202 and additionally across the first and a third terminal of the leakage energy recovery circuit 220. The bypass capacitor 222 stores the energy recovered by the leakage energy recovery circuit 220 for use by the inverter 102.

The switch controller 206 is coupled to a gate terminal of the switch 204 to control the voltage applied to the primary winding of the transformer 208. The diode 210 is coupled in series with a secondary winding of the transformer 208 for rectifying the voltage across the secondary winding of the transformer 208. The capacitor 212 is coupled in parallel to the series combination of the diode 210 and the secondary winding, i.e., the anode terminal of the diode 210 is connected to a first terminal of the secondary winding, the cathode terminal of the diode 210 is connected to a first terminal of the capacitor 212, and a second terminal of the capacitor 212 is coupled to a second terminal of the secondary winding. The capacitor 212 is further coupled across the switch matrix 214. The voltage across the capacitor 212 is applied to the switch matrix 214 which comprises, for example, four silicon controlled rectifiers arranged in an H-bridge pattern. In alternative embodiments, the switch matrix 214 may utilize one or more different switches, such as metal-oxide semiconductor field effect transistors (MOSFETs), bipolar junction transistors (BJTs), and the like. The switch driver 216 is coupled to the switch matrix 214 for controlling the switching of the switch matrix 214.

The DC power source 202 applies a DC voltage to the primary winding of the transformer 208 in accordance with operation of the switch 204. In one embodiment, a MOSFET is used as the switch 204 due to its high switching speed and efficiency. However, in other embodiments, various other types of switches may be used. The gate terminal of the switch 204 is controlled by the switch controller 206 such that the switch 204 is operated to apply a pulsed DC voltage to the primary winding of the transformer 208.

In response to the pulsed DC voltage in the primary winding of the transformer 208, a pulsed DC voltage is produced as an output waveform in the secondary winding of the transformer 208, where the pulsed DC voltage output waveform is at a different voltage level than the pulsed DC voltage input waveform. Thus, the transformer 208 "steps up" the pulsed DC voltage applied to the primary winding.

The diode 210 and the capacitor 212 rectify the output voltage from the transformer 208. The rectified output voltage is then applied to the H-bridge switch matrix 214. The switch matrix 214, as controlled by the switch driver 216, selectively applies current to the output terminals to form an output AC waveform that is synchronized to the power grid, e.g., a frequency of 60 Hertz in some embodiments.

Figure 3:
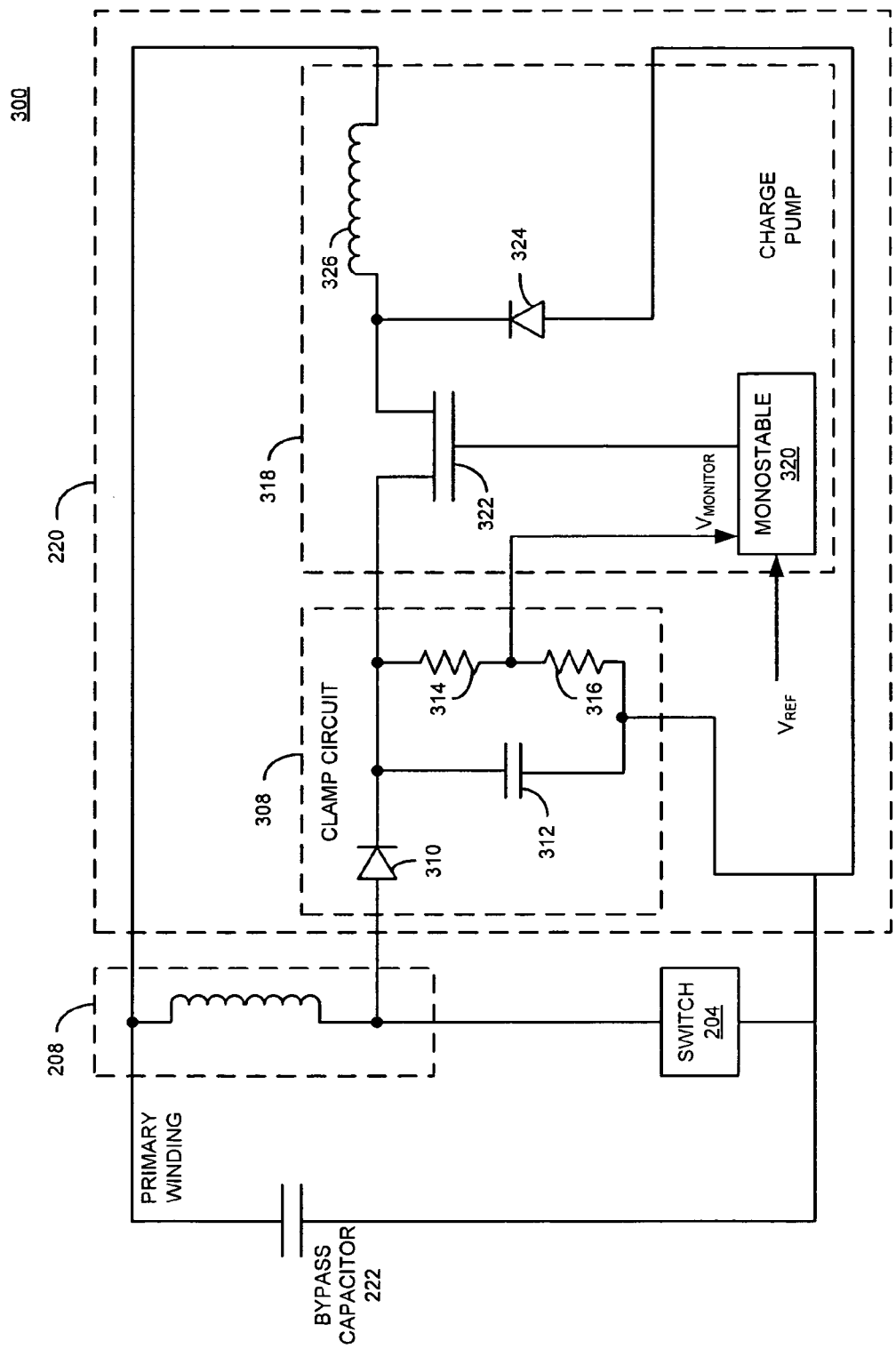
FIG. 3 is a schematic representation of a leakage energy recovery circuit in accordance with one or more embodiments of the present invention.

FIG. 3 is a schematic representation of a leakage energy recovery circuit 220 in accordance with one or more embodiments of the present invention. The leakage energy recovery circuit 220 is designed to recover and store energy from the leakage inductance of the transformer 208 and to feed such stored leakage energy back to the input of the inverter 102.

The leakage energy recovery circuit 220 comprises a clamp circuit 308 and a charge pump 318. The series combination of the transformer 208 (primary winding shown) and the switch 204 are coupled to the clamp circuit 308 and the charge pump 318 as described in detail below. The clamp circuit 308 acts as a leakage energy storage circuit and stores leakage energy generated by the transformer 208, while the charge pump 318 acts as a leakage energy transfer circuit by monitoring the amount of stored leakage energy and, at an appropriate time, applying the accumulated stored leakage energy to the input of the transformer 208 (i.e. the bypass capacitor 222). Thus, the clamp circuit 308 and the charge pump 318 recover the leakage energy and re-circulate such leakage energy back to the bypass capacitor 222 for use by the inverter 102. In some embodiments, such as the embodiments depicted in FIG. 3, the charge pump 318 is a "buck" converter structure; in alternative embodiments, the charge pump 318 may be a step down "flyback" structure.

The clamp circuit 308 includes a diode 310, a capacitor 312, and a pair of resistors 314, 316. The anode terminal of the diode 310 is coupled to the second terminal of the primary winding of the transformer 208, and the cathode terminal of the diode 310 is coupled to a first terminal of the capacitor 312 and a first terminal of the resistor 314. A second terminal of the resistor 314 is coupled in series to a first terminal of the resistor 316, and a second terminal of the resistor 316 is coupled to a second terminal of the capacitor 312; thus, the series combination of the resistors 314 and 316 are coupled across the capacitor 312. Additionally, the second terminal of the capacitor 312 and the second terminal of the resistor 316 are coupled to the second terminal of switch 204.

In the clamp circuit 308, the leakage energy is coupled through the diode 310 to the capacitor 312, which stores the leakage energy that has accumulated as a positive residual voltage across the switch 204. The leakage energy stored in the capacitor 312 is divided across the resistor pair 314, 316 to form a monitor voltage, $V_{monitor}$, at the junction of the resistor pair 314, 316.

The charge pump 318 comprises a monostable circuit 320, a switch 322, a diode 324, and an inductor 326. The switch 322 is coupled to the first terminal of the capacitor 312 and to the cathode terminal of the diode 324; the anode terminal of the diode 324 is coupled to the second terminal of the capacitor 312 and the second terminal of the switch 204. Additionally, the cathode terminal of the diode 324 is coupled through the inductor 326 to the first terminal of the primary winding of the transformer 208. The inductor 326 acts as a low-pass filter to remove any switch transients created by the switch 322, while the diode 324 ensures the correct biasing across the switch 322 and enables the switch 322 to properly activate and deactivate.

An output of the monostable circuit 320 is coupled to the gate terminal of the switch 322 for controlling the operation of the switch 322 (i.e. turning the switch on/off); thus, the monostable circuit 320 acts as a driving circuit for the switch 322. The monostable circuit 320 receives the monitor voltage, $V_{MONITOR}$, from the clamp circuit as a first input and a threshold voltage, $V_{REF}$, as a second input. When the monitor voltage is less than the threshold voltage, the output of the monostable circuit 320 maintains the switch 322 in an off state and the leakage energy charges the capacitor 312. When the voltage across the capacitor 312 reaches a level sufficient to cause the monitor voltage to exceed the threshold voltage, the output of the monostable circuit 320 drives the switch 322 in a conductive state. The voltage across the capacitor 312 is presented to the inductor 326, and the current into the inductor 326 rises until the monostable circuit 320 times out. The switch 322 then switches off, and the diode 324 turns on to recycle the energy stored in the inductor 326 into the bypass capacitor 222 until it is fully expensed. At that time, the monostable circuit 320 may be rerun as long as the voltage on the capacitor 312 results in a monitor voltage above the threshold voltage. The leakage energy is thus "fed-back" to the bypass capacitor 222 such that the leakage energy is recovered for use by the inverter 200.

The theoretical peak voltage present at the junction of the switch 204 and the transformer 208 can be approximately described as $V \sim V_{IN} + V_{OUT}/n$, where $V_{IN}$ is the input voltage across the DC power source 202 and the bypass capacitor 222, $V_{OUT}$ is the output voltage across the capacitor 22212, and n is the ratio of the transformer 208. Any leakage energy surge will move the voltage over the theoretical peak voltage value. In some embodiments, the optimum $V_{REF}$ for the leakage energy recovery circuit 220 may be obtained utilizing the above formula (while factoring in the voltage divider of the resistor pair 314, 316) and with the addition of a small voltage margin.

Figure 4:
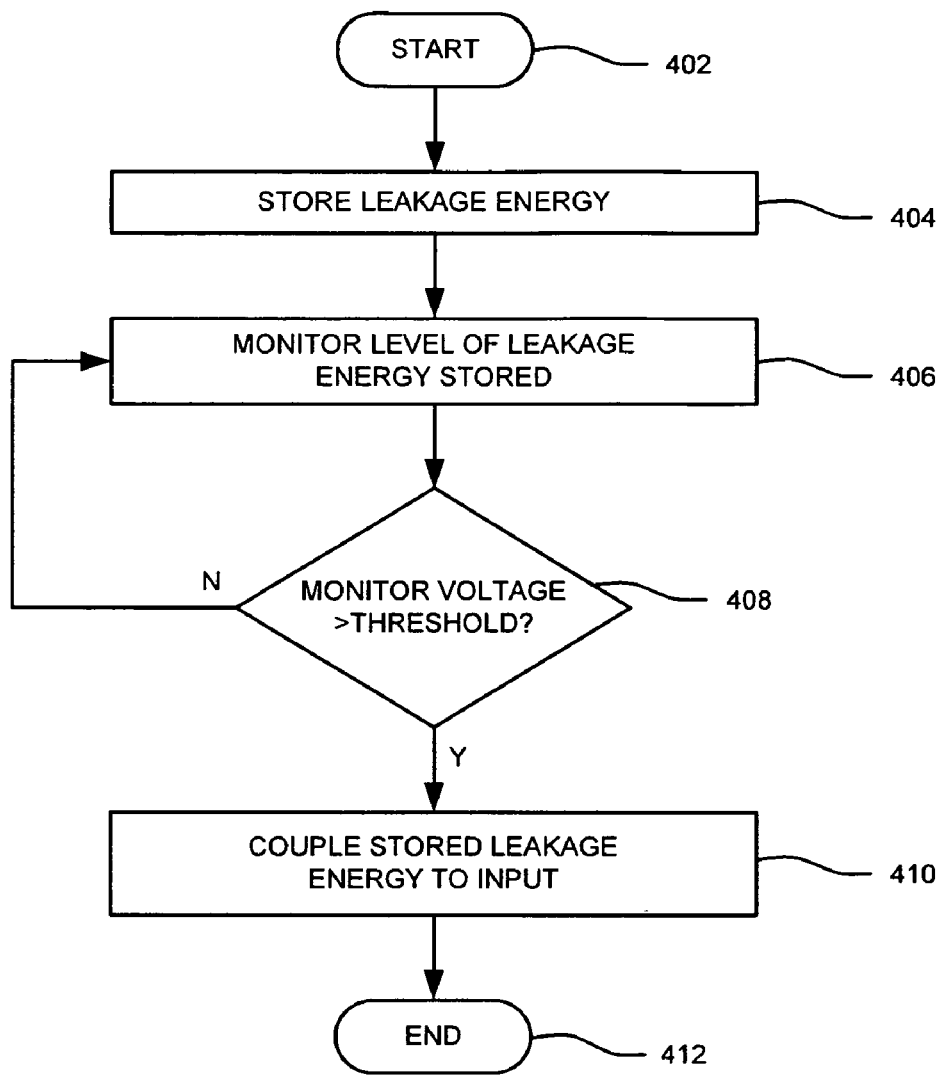
FIG. 4 is a flow diagram of a method for recovering leakage energy in accordance with one or more embodiments of the present invention.

FIG. 4 is a flow diagram of a method 400 for recovering leakage energy in accordance with one or more embodiments of the present invention. In some embodiments, such as the embodiment described below, a DC-AC inverter converts DC input power to AC output power. The DC-AC inverter comprises a step-up transformer for converting the DC input power to a second DC power, resulting in a leakage inductance from the transformer.

The method 400 begins at step 402 and proceeds to step 404. At step 404, leakage energy from the transformer leakage inductance is stored. In some embodiments, the leakage energy is stored in a capacitor coupled across a current control switch that is coupled in series with the transformer, such as the capacitor 312 within the clamp circuit 308 described above. At step 406, the amount of leakage energy stored is monitored. In some embodiments, a monitor voltage is obtained from a voltage divider coupled across the capacitor that stores the leakage energy. The monitor voltage provides an indication of the voltage across the capacitor (i.e., the amount of leakage energy stored in the capacitor).

The method 400 proceeds to step 408, where the monitor voltage is compared to a threshold voltage and a determination is made whether the monitor voltage exceeds the threshold voltage. An optimum threshold voltage may be obtained in accordance with an input voltage of the transformer, an output voltage of the transformer, and a ratio of the transformer, where the voltage divider is factored in along with a small voltage margin, as previously described with respect to FIG. 3. If the monitor voltage does not exceed the threshold voltage, the method 400 returns to step 406. If the monitor voltage does exceed the threshold voltage, sufficient leakage energy has been stored in the capacitor and the method 400 proceeds to step 410.

At step 410, the stored leakage energy is coupled to the input of the DC-AC inverter, for example to a bypass capacitor at the input of the DC-AC inverter. In some embodiments, a monostable circuit drives a switch to close (i.e., conduct) when the monitor voltage exceeds the threshold voltage and thereby couples the stored leakage energy to the input of the DC-AC inverter. The monostable circuit causes the switch to remain closed for a pre-determined time, after which the switch opens and any leakage energy is again stored. The method 400 then proceeds to step 412 where it ends.

Various embodiments as discussed herein, help in preventing the wastage of the leakage energy in an inverter circuit by utilizing the leakage energy. By utilizing the leakage energy, the embodiment of the present invention further helps in increasing the efficiency of the power inverter.

In the foregoing specification, one or more specific embodiments of the present invention have been described. However, one of ordinary skill in the art will appreciate that various modifications and changes can be made without departing from the spirit and scope of the present invention. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements as described herein.

The invention claimed is:

1. An apparatus for recovering leakage energy during DC power to AC power conversion, comprising:
   a leakage energy recovery circuit for storing the leakage energy from a transformer and selectively coupling stored leakage energy to an input of the transformer, wherein the leakage energy recovery circuit comprises a storage circuit for storing the leakage energy and a transfer circuit for selectively coupling the leakage energy to the input when a monitor voltage satisfies a threshold.

2. The apparatus of claim 1, wherein the storage circuit generates the monitor voltage in accordance with an amount of the stored leakage energy.

3. The apparatus of claim 2, wherein the storage circuit comprises a voltage divider for generating the monitor voltage.

4. The apparatus of claim 1, wherein the transfer circuit comprises:
   a switch for causing (i) the leakage energy to be stored when the switch is in a first state and (ii) the leakage energy to be coupled to the input when the switch is in a second state; and
   a driving circuit for driving the switch to the second state when the monitor voltage satisfies the threshold.

5. The apparatus of claim 4, wherein the switch remains in the second state for a period of time determined by the driving circuit.

6. The apparatus of claim 1, wherein the threshold is determined in accordance with an input voltage of the transformer, an output voltage of the transformer, and a ratio of the transformer.

7. The apparatus of claim 1, further comprising a bypass capacitor, wherein the stored leakage energy is coupled to the bypass capacitor.

8. A method for recovering leakage energy during DC power to AC power conversion, comprising:
   storing the leakage energy generated by a transformer,
   generating a monitor voltage for indicating an amount of stored leakage energy;
   comparing the monitor voltage to a threshold; and
   coupling the stored leakage energy to an input of the transformer when the monitor voltage satisfies the threshold.

9. The method of claim 8, wherein the storing leakage energy comprises operating a switch in a first state.

10. The method of claim 9, wherein the coupling the stored leakage energy comprises operating the switch in a second state.

11. The method of claim 10, further comprising operating the switch in the second state for a predetermined period of time.

12. The method of claim 8, further comprising determining the threshold in accordance with an input voltage of the transformer, an output voltage of the transformer, and a ratio of the transformer.

13. An inverter for converting DC power to AC power, comprising:
   a transformer for converting a first DC power to a second DC power;
   an H-bridge for converting the second DC power to the AC power; and
   a leakage energy recovery circuit for storing leakage energy from the transformer and selectively coupling stored leakage energy to an input of the transformer, wherein the leakage energy recovery circuit comprises a storage circuit for storing the leakage energy and a transfer circuit for selectively coupling the leakage energy to the input when a monitor voltage satisfies a threshold.

14. The inverter of claim 13, wherein the storage circuit generates the monitor voltage in accordance with an amount of the stored leakage energy.

15. The inverter of claim 13, wherein the transfer circuit comprises:

a switch for causing (i) the leakage energy to be stored when the switch is in a first state and (ii) the leakage energy to be coupled to the input when the switch is in a second state; and a driving circuit for driving the switch to the second state when the monitor voltage satisfies the threshold.

16. The inverter of claim 15, wherein the switch remains in the second state for a period of time determined by the driving circuit.

17. The inverter of claim 13, wherein the threshold is determined in accordance with an input voltage of the transformer, an output voltage of the transformer, and a ratio of the transformer.

18. The inverter of claim 13, wherein the at least one inverter further comprises a bypass capacitor, wherein the stored leakage energy is coupled to the bypass capacitor.

* * * * *